United States Patent [19]

Liu

[11] Patent Number: 4,599,381

[45] Date of Patent: Jul. 8, 1986

[54] SILICONE-MODIFIED PVC

[75] Inventor: Wan-Li Liu, Ballston Lake, N.Y.

[73] Assignee: General Electric Company, Silicone Products Division, Waterford, N.Y.

[21] Appl. No.: 703,637

[22] Filed: Feb. 21, 1985

[51] Int. Cl.[4] ............................................. C08G 77/42
[52] U.S. Cl. ...................................... 525/104; 525/106
[58] Field of Search ................................ 525/104, 106

[56] References Cited

U.S. PATENT DOCUMENTS

| | | | |
|---|---|---|---|
| 3,644,566 | 2/1972 | Kincheloe et al. | 525/106 |
| 3,674,891 | 7/1972 | Wheeler | 525/106 |
| 3,870,766 | 3/1975 | Chadha | 525/106 |
| 4,276,389 | 6/1981 | Wieder et al. | 525/106 |

*Primary Examiner*—Wilbert J. Briggs, Sr.
*Attorney, Agent, or Firm*—Gary L. Loser

[57] ABSTRACT

There is provided a graft copolymer comprising poly(vinyl chloride) polymer having grafted thereto a silicone polymer. Methods for making such graft copolymers are also provided.

12 Claims, No Drawings

SILICONE-MODIFIED PVC

BACKGROUND OF THE INVENTION

The present invention relates to poly(vinyl chloride), e.g. PVC, polymers modified with silicones. More particularly, the present invention relates to poly(vinyl chloride) polymers having polydiorganosiloxane chains grafted onto the PVC polymer backbone and methods for making such graft copolymers.

Poly(vinyl chloride) resins are used extensively for making floor covering materials such as linoleum, floor tiles and the like. One disadvantage of such floor covering materials is that they are relatively easily scuffed. Accordingly, a great deal of effort has been made by manufacturers to improve the scuff resistance of these PVC floor covering materials.

Presently it is generally accepted that the most effective and least expensive means for improving scuff resistance is to apply a coating of wax or polish to the floor's surface. However, such protective coatings are removed over a relatively short period of time by repeated washings with various commonly used cleansing agents. Thus it remains a problem in the floor coverings art to provide PVC floor coverings which exhibit substantially-permanent resistance to scuffing.

It is, of course, well known that vinyl chloride can be copolymerized with other monomers to improve the properties of poly(vinyl chloride). See, for example, Encyclopedia of Polymer Science and Technology (1971), John Wiley and Sons, Inc., Vol. 14, pages 345–358. Such copolymers can be either random or block copolymers. Nowhere, however, does the prior art disclose or suggest that the properties of PVC polymer can be improved by grafting polydiorganosiloxane chains to the poly(vinyl chloride) backbone.

SUMMARY OF THE INVENTION

It is an object of the present invention to provide poly(vinyl chloride) polymer having silicone chains, which preferably are polydiorganosiloxane chains, grafted thereto.

It is another object of the present invention to provide methods for making poly(vinyl chloride)/polydiorganosiloxane graft copolymers.

Still another object of the present invention is to provide floor covering articles made from poly(vinyl chloride)/polydiorganosiloxane graft copolymers which are substantially resistant to scuffing.

In accordance with the present invention there is provided novel poly(vinyl chloride)/silicone graft copolymers comprising a poly(vinyl chloride) polymer or copolymer having bonded thereto at least one silicone chain which preferably is a polydiorganosiloxane chain.

In another aspect of the present invention poly(vinyl chloride)/polydiorganosiloxane graft copolymers can be prepared by ring-opening grafting of at least one cyclic polydiorganosiloxane onto the poly(vinyl chloride) polymer backbone in the presence of a cationic initiator. Alternatively, the graft copolymer of the present invention can be prepared by the condensation reaction of a low molecular weight linear polydiorganosiloxane with the chlorine of the PVC polymer in the presence of a condensation catalyst.

DESCRIPTION OF THE INVENTION

In its broadcast aspect the present invention resides in the discovery of novel poly(vinyl chloride)/silicone graft copolymers comprising a poly(vinyl chloride) polymer or copolymer having bonded thereto at least one silicone chain. Hereinafter the terms "PVC polymer" and "poly(vinyl chloride) polymer" include both homopolymers and copolymers.

The poly(vinyl chloride) polymer can be a homopolymer or any copolymer known to those skilled in the art. Examples of suitable poly(vinyl chloride) copolymers are described in the Encyclopedia of Polymer Science and Technology (1971), John Wiley and Sons, Inc., Vol. 14, pages 345–358, which is incorporated into the instant disclosure by reference, and includes copolymers of vinyl chloride with vinyl acetate and other esters; copolymers of vinyl chloride and olefins such as ethylene, propylene, and the like; copolymers of vinyl chloride and vinylidene chloride; copolymer of vinyl chloride and lower vinyl ethers; and copolymers of vinyl chloride and acrylonitrile. Other suitable copolymers which include vinyl chloride units will be obvious to those of ordinary skill in the art. It is also within the intended scope of the present invention that the copolymers can be prepared from more than two monomers. The ratios of the various monomers to vinyl chloride monomer which will result in useful PVC copolymers will also be obvious to the skilled artisan.

Preferably the silicone polymer grafted to the poly(vinyl chloride) polymer is a polydiorganosiloxane which has the general formula

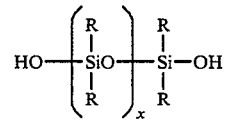

where R is an independently selected monovalent organic radical, preferably a lower alkyl or phenyl radical or halogen substituted lower alkyl or phenyl radical, and most preferably is methyl; and x is a positive integer, preferably from 2 to 20, and most preferably from 2 to 9.

The poly(vinyl chloride)/polydioranosiloxane graft copolymers of the present invention can be prepared by any of several methods. Preferably a cyclic polydiorganosiloxane having the general formula

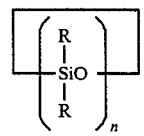

where R is as previously defined and n is an integer equal to or greater than 3, preferably 3 to 10, and most preferably 3 or 4, is reacted under anhydrous conditions with (e.g. grafted to) poly(vinyl chloride) polymer in the presence of a cationic initiator, which preferably is diethylaluminum chloride. Other suitable cationic initiators can be determined by the artisan without undue experimentation. Schematically the preparation of the graft copolymers of the present invention can be represented as follows:

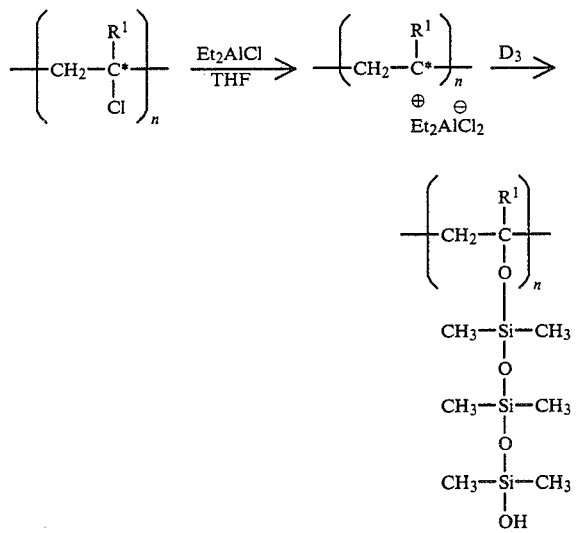

where $R^1$ is hydrogen or PVC polymer chain, C* is an active site, and $D_3$ is hexamethylcyclotrisiloxane. C* is also referred to in the art as an active chloride or active carbon. The artisan will appreciate that the number of reactive chlorides that will be replaced with siloxane chains will depend upon the ratio of hexamethyltrisiloxane (or other cyclic siloxane) to reactive chlorides. Further, the artisan will appreciate that if excess hexamethylcyclotrisiloxane (or other cyclic siloxane) is utilized the length of the grafted polysiloxane chain will be extended. Thus, for example, if he ratio of $D_3$ to reactive chlorides in the above illustration is greater than 1, some or all of the siloxane chains will have more siloxy units than illustrated. Of course, even when an excess of cyclic siloxane is not utilized, a small number of the grafted siloxane chains will likely be longer than the number of siloxy units in the cyclic siloxane from which it derives due to normal reaction kinetics.

The molar ratio of cyclopolydiorganosiloxane to reactive chlorides of the poly(vinyl chloride) polymer preferably is in the range of about 5:1 to about 1:5, more preferable is in the range of about 2:1 to about 1:2, and most preferably has a ratio of about 1:1. If the molar ratio of polysiloxane to reactive chloride exceeds 5:1, the resulting graft copolymer is to fluid and the properties of PVC are not exhibited to the extent desirable. If, on the other hand, the molar ratio of polysiloxane to reactive chloride is less than 1:5 the properties of the polysiloxane are not exhibited to the extent desirable.

Another method for preparing the graft copolymers of the present invention involves reacting a linear, low molecular weight, silanol-terminated polydiorganosiloxane with poly(vinyl chloride) polymer in the presence of a suitable condensation catalyst. Preferably there are less than about 10 siloxy units in the linear polydiorganosiloxane. Those skilled in the art will be able to select a suitable condensation catalyst without undue experimentation. The molar ratio of linear polydiorganosiloxane to reactive chloride atoms of the PVC polymer preferably is in the range of about 5:1 to about 1:5, more preferably is in the range of about 2:1 to about 1:2, and most preferably is about 1:1.

The graft copolymers of the present invention can be employed almost anywhere an abrasion and scuff resistant material is needed. A particularly useful application which employs the graft copolymer of the invention is in the field of floor coverings. Those skilled in the art will be able to make floor coverings from the graft copolymers of the invention without undue experimentation.

In order to better enable those skilled in the art to practice the present invention the following examples are provided by way of illustration and not by way of limitation. All parts are by weight—unless otherwise noted.

EXAMPLES

Example 1

In a reaction flask ten grams of poly(vinyl chloride) resin were dissolved in 200 grams of dry tetrahydrofuran (THF). After dissolving the PVC resin, ten grams of hexamethylcyclotrisiloxane ($D_3$ monomer) were added to the PVC/THF solution. Thereafter, 0.18 gram of diethylaluminum chloride initiator was added to the reaction flask. The reaction was carried out under anhydrous conditions at room temperature. After stirring for eight hours the grafted copolymer was precipitated in 500 ml of methanol with stirring, then filtered and dried. A film of this graft copolymer was tough, flexible and scuff resistant.

Example 2

Twenty-five grams of PVC resin were dissolved in 250 grams of cyclohexanone in a round bottom flask. Twenty-five grams of octamethylcyclotetrasiloxane ($D_4$ monomer) in 50 grams of toluene were then added to the flask. Water was azeotroped from the reaction flask using a Dean-Stark trap. Thereafter, 1.77 grams of diethylaluminum chloride was then added with stirring at a temperature of 100° C. Stirring was maintained at this temperature for one hour at which time the graft copolymer was precipitated in methanol, then filtered and dried. A film of this graft copolymer was tough, flexible and scuff resistant.

Example 3

Ten grams of PVC resin were dissolved in 200 grams of dry tetrahydrofuran. Ten grams of octamethylcyclotetrasiloxane were added to the PVC/THF solution. Next, 0.18 grams of diethylaluminum chloride was added to the reaction mass as an initiator. Reaction was carried out under anhydrous conditions at room temperature. After stirring for eight hours the graft copolymer was precipitated in 500 ml of methanol with stirring, then filtered and dried. A film of this product was tough, flexible and scuff resistant.

Example 4

Two hundred grams of PVC resin were dissolved in 2500 grams of tetrahydrofuran in a 5000 ml flask. Two hundred grams of octamethylcyclotetrasiloxane and 200 ml pentane were mixed and added to the flask. Ten grams of 4 Angstrom molecular sieve were added to remove residual water. After stirring overnight the molecular sieve was removed by filtration and then 8.9 grams of diethylaluminum chloride were added to the reaction flask at a temperature of 57° C. The reaction mass was stirred for an additional six hours at this temperature. The product was thereafter precipitated in methanol, filtered and dried. A film of this graft copolymer was tough, flexible and scuff resistant.

I claim:

1. A method for grafting a polydiorganosiloxane to a poly(vinyl chloride) polymer, comprising reacting a cyclic polydiorganosiloxane with poly(vinyl chloride) polymer under anhydrous conditions in the presence of a cationic initiator.

2. A method as in claim 1, wherein reaction is effected in a solvent.

3. A method as in claim 2, wherein the solvent is tetrahydrofuran, cyclohexanone, or a mixture thereof.

4. A method as in claim 1, wherein the cyclic polydiorganosiloxane has the general formula

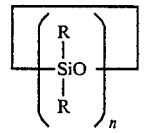

where R is an independently selected monovalent organic radical and n is an integer equal to or greater than 3.

5. A method as in claim 4, wherein R is a lower alkyl radical or phenyl radical and n is an integer from 3 to 20, inclusive.

6. A method as in claim 4, wherein R is methyl and n equals 3 or 4.

7. A method as in claim 1, wherein the cationic initiator is diethylaluminum chloride.

8. A method as in claim 1, wherein the molar ratio of cyclic polydiorganosiloxane to reactive chloride of the poly(vinyl chloride) polymer ranges from about 5:1 to about 1:5.

9. A method as in claim 1, wherein the molar ratio of cyclic polydiorganosiloxane to reactive chloride of the poly(vinyl chloride) polymer ranges from about 2:1 to about 1:2.

10. A method as in claim 1, wherein the molar ratio of cyclic polydiorganosiloxane to reactive chloride of the poly(vinyl chloride) polymer is about 1:1.

11. A method for making a poly(vinyl chloride)/polydiorganosiloxane graft copolymer, comprising:
    (a) reacting a cyclic polydiorganosiloxane with poly(vinyl chloride) polymer under anhydrous conditions in the presence of a cationic initiator, and
    (b) recovering the graft copolymer formed in (a).

12. A method as in claim 11, wherein the graft copolymer is recovered by precipitation, filtering and drying.

* * * * *